United States Patent [19]

Yamazaki et al.

[11] Patent Number: 5,800,265

[45] Date of Patent: Sep. 1, 1998

[54] GAME MACHINE

[75] Inventors: Shunpei Yamazaki, Tokyo; Akiharu Miyanaga; Toshiji Hamatani, both of Kanagawa, all of Japan

[73] Assignee: Semiconductor Energy Laboratory Co., Ltd., Kanagawa-ken, Japan

[21] Appl. No.: 408,009

[22] Filed: Mar. 21, 1995

[30] Foreign Application Priority Data

Feb. 24, 1995 [JP] Japan ................................. 7-61645

[51] Int. Cl.⁶ ............................. A63F 9/24; A63F 33/00
[52] U.S. Cl. ................................... 463/23; 463/36
[58] Field of Search ........................ 463/16, 21, 22, 463/36; 364/717; 380/46, 48; 273/121 B

[56] References Cited

U.S. PATENT DOCUMENTS

5,270,748  12/1993  Katz ............................ 351/210
5,360,971  11/1994  Kaufman et al. ............... 250/221
5,395,110   3/1995  Yamazaki et al. .............. 273/108

*Primary Examiner*—Jessica Harrison
*Attorney, Agent, or Firm*—Sixbey, Friedman, Leedom & Ferguson, PC; Gerald J. Ferguson, Jr.; Eric J. Robinson

[57] ABSTRACT

A game machine for preventing its game contents from becoming monotonous. A game machine has a display device 11 (e.g., a liquid crystal display) on which game contents are displayed. The machine creates a chaos attractor intrinsic to the human player by making use of information detected from a line-of-sight input device 16 that recognizes the line of sight of the player. The machine controls the game contents, utilizing this chaos attractor. In this way, the game contents can be made intrinsic to the player.

9 Claims, 6 Drawing Sheets

GAME MACHINE

BACKGROUND OF THE INVENTION

1. Field of the Invention

The present invention relates to a novel game machine for varying game contents according to response of a human player or players to a games content. Examples of this game machine include domestic TV games played in ordinary homes by making use of TV displays, portable game machines using small-sized display devices, and game machines which are installed in game arcades and use large-sized display devices.

2. Description of Related Art

Today, TV game machines that are connected to conventional TV receivers in homes are known. Such a TV game machine is generally equipped with a Central Processing Unit (CPU), various memories, and a control circuit. Users can play various TV games, i.e., games displayed on the TV display, by connecting a magnetic disk or solid-state memory with the machine, the magnetic disk or solid-state memory having information necessary for operation of a game recorded therein. Such a game includes speech and sound effects, as well as image information to be displayed on the display. Furthermore, such games can include music. Typically, various games can be selectively played by replacing the magnetic disk or solid-state memory that contain the information necessary for operation of the game.

In these TV games, a category known as "shooting games" is known. In these games, a player aims at targets appearing on a viewing screen and shoots down or destroys the targets. In these games, the targets may make complex evasive movements, or the targets themselves may shoot at the player. Thus, the operation of the game is normally complicated. Furthermore, as the game progresses, the complexity is usually increased, so that it is more difficult for the player to make the game proceed.

The above-described complex movements of the targets and attack patterns are permitted according to a given program. Otherwise, one is selected from a number of predetermined patterns, using some kind of random number generator, so that the movements and pattern are determined. The combination of those patterns is ingeniously devised so that it cannot be discovered by the player.

Although various given patterns (such as target avoidance patterns, attack patterns, and game progress patterns) established during the game are complex, they still have regularities. After a game is repeated many times (normally hundreds of times), the rules are discovered by the player, or the player becomes accustomed to such patterns. As a result, the player's interest in the game is reduced.

Generally, the above-described problems are addressed by making the game operation more complex. For example, as a game progresses, the motion of targets flying on the viewing screen is made more complex and their speed is increased. Furthermore, more targets are made to appear. However, mere complication of the game contents also tends to cause the player to get tired. For instance, if the number of targets appearing in a shooting game is increased and the degree of difficulty is enhanced, only reflexes and skillfulness are required. Finally, whether the player is accustomed with the game or not is the only factor affecting the difficulty of the game. Hence, the game itself is no longer interesting to the player.

These problems do exist. The present situation is that new kinds of game software are successively put into the market by varying the appearance of characters and changing established game conditions. These situations are not limited to shooting games. For example, simulation games and sport-based games have essentially the same configuration.

SUMMARY OF THE INVENTION

The operation of the aforementioned TV games evolve day by day, and the contents have rich variations. However, after a player has enjoyed a game for some time, he or she gets tired, because the game machine responds routinely in a preset sequence or according to a preset program, though numerous patterns are provided.

On the other hand, the player's responses vary according to the game content; i.e. the player's operation of the game machine varies. Furthermore, the speed of the player's response varies according to the game content. Moreover, the player's feeling, sense, state of health, and mental and physical state vary from instant to instant and according to the game content. Therefore, if the response of the game machine remains the same, then the player will get tired. As one solution to the above-described problems, the invention disclosed herein proposes a game machine in which one or more parameters indicating the player's response, mental and physical state of the player, or the emotion of the player are used as one or more conditions determining the manner in which the TV game machine responds, whereby the game content and operation have increased variety.

One embodiment of the present invention comprises:

an image display means on which contents of a game are displayed;

a means for controlling said game contents;

a means for calculating a chaos attractor obtained by numerically processing information about a human player responding to said game contents; and a means for varying the game contents by making use of an index indicating a degree to which said chaos attractor is matched to chaos definition conditions.

In the above-described configuration, the information about the player can be the line of sight of the player responding to the game contents displayed on the image display means. Information indicating mental and physical state of the player can also be used. Furthermore, information about the playing techniques of the player can be used.

The aforementioned means for controlling the game contents, the means for calculating the chaos attractor, and the means for varying the game contents are composed of well-known semiconductor integrated circuits or the like.

The configuration of another embodiment of the present invention is a game machine having game contents which are displayed as an image, said game machine comprising:

a sensor for accepting information from a human player;

a chaos attractor-generating portion for numerically processing data accepted by said sensor and calculating a chaos attractor;

a Lyapunov index-generating portion for calculating an index indicating a degree to which said chaos attractor matches chaos definition conditions;

a mental and physical state-detecting system for detecting a mental and physical state of the player from said Lyapunov index; and an image variation means for varying contents of the image according to information indicating mental and physical state of the player offered from the mental and physical state-detecting system.

The configuration of a further embodiment of the invention comprises:

a sensor for accepting information from a plurality of players;

a chaos attractor-generating portion for numerically processing data accepted by said sensor and calculating a chaos attractor;

a Lyapunov index-generating portion for calculating an index indicating a degree to which said chaos attractor matches chaos definition conditions;

a means for calculating information about each individual player from said index; and a variation means for varying game contents for each individual player according to information about the individual players.

The inventions disclosed herein are characterized in that a chaos attractor intrinsic to a human player is compared with chaos definition conditions which have been classified in a given manner. The chaos attractor is obtained by numerically processing information collected from the player. With respect to the chaos definition conditions, data about the chaos attractor has been already obtained. In this way, the mental and physical state of the player at that time is detected. The response of the player to the game contents is varied. Also, the response of the game machine is varied according to the psychological state of the player.

The game circumstances are adjusted optimally according to the circumstances of the player who is now playing the game. In this way, the game can be played more comfortably. In addition, a game machine is offered which assigns information obtained from a human player who is playing the game to plural preset levels and which varies the response according to the present level, even if the concept of chaos cannot be applied to the information.

Information obtained from the player includes: (1) response of the player to the game and habits; (2) the speed at which the player operates game operation switches and operation pattern; (3) the line of sight of the player; and (4) changes in physical body state indicated by the blood pressure of the player, variations in resistance of the skin, and so on. The information obtained from the player may be one or more of these.

The term "chaos" is now explained. In both the world of nature and the artificial world, there are many phenomena that can be predicted. For example, it is possible to predict and respond to the position of both Halley's comet as well as artificial satellites. The deterministic predictability in which cause and effect is clear seems to be one of the great capabilities of science.

However, although weather forecasting can be regarded as the prediction of air movement that follows physical rules, it often turns out to be incorrect. In these phenomena, the causes and effects seem to be unclear and these phenomena are said to have random components. It has been basically thought that when complete parameters for describing a system are clear, an accurate prediction can be made. In other words, it has been thought that when it is possible to sufficiently collect information on a system, an accurate prediction of the behavior of that system can be made.

Specifically, it has been thought that randomness arises from the fact that sufficient information about a many-degree of freedom system is not available. However, it has been discovered that even a simple system having a few degrees of freedom (less than three-dimensionality) may show random behaviors. Therefore, one which is deterministic but essentially random has been discovered. Such randomness has come to be called chaos.

However, the concept of chaos has not yet been unified. As with the theory of evolution, chaos is defined broadly. It seems that the concept differs from subject to subject. The concept of chaos as used herein is summarized as follows.

Chaos is a system having deterministic rules but very complex behavior that appears as a nonlinear behavior. As a result, chaos means an essentially random phenomenon. This indicates that complex orderliness or rules exist behind phenomena which apparently seem to be random and lack rules or ability to be forecasted. A topology which characterizes behaviors of chaos is called a chaos attractor. This is a mathematical structure into which the behaviors of the system creating a chaos are converged.

From this viewpoint it is known that pulse waves and heartbeat data detected from a human body behave chaotically. In academic societies or the like, one authority has reported mental and physical information about chaos indicated by finger-like pulse waves and has filed a patent application for a medical diagnostic method using this chaos (Patent Laid-Open No. 208136/1994). In particular, they have found that a chaos attractor that is a mapped image in which pulse wave data obtained from a finger tip portion is buried in a number space and Lyapunov numbers that indicate the degree of adaptability to chaos defining conditions closely relate to cerebral information processing of a subject.

On the other hand, it is known that a given human behavior pattern exists according to the individuality of each person. For example, it is known that individual persons respond separately in driving, eating, and assembling documents, respond separately to given stimuli, and that each individual person has his or her own given pattern.

These human behavior patterns cannot be easily classified. However, research by the present inventors has shown that a response of a player to a game, and mental and physical states of the player, can be detected as chaotic behaviors. That is, the manner in which the player operates the game machine and the player's mental and physical states can be detected as chaotic behaviors. On the other hand, chaotic behaviors can also be expressed in terms of given mathematical formulas indicating a chaos attractor. Therefore, the response of the player to a game and the playing pattern can be expressed by making use of the formulas.

Consequently, the playing pattern of the player can be forecasted by utilizing the given chaos attractor. If one obeys this given chaos attractor, it is possible to cope with the situation while forecasting the game contents to some extent. Of course, the forecast made based on this chaos attractor is not perfect.

The invention disclosed herein makes positive use of both a chaos attractor and the fact that a Lyapunov number, indicating the degree to which data about the chaos attractor matches chaos definition conditions, has a correlation with mental and physical information about a human body. The chaos attractor is obtained by numerically processing various kinds of information obtained from the player. In other words, pulse wave and/or heartbeat data obtained from a body surface can be displayed by means of a display means such as a CRT by burying the above data in a four dimensional number space by a Tarkens plot method, projecting it onto a three-dimensional number space, and then projecting it onto a two-dimensional number space.

In practice, burying the pulse wave data into the four-dimensional numerical space means: inputting numerical values for the pulse wave data in a microcomputer as a numerical value X of the first axis, the tenth numerical value from this point (for example, as regular intervals τ=10) is a numerical value Y of the second axis, the twentieth one is a numerical value Z of the third axis, and the thirtieth one is a numerical value W of the forth axis, a four dimensional vector is formed by these numerical values. In this way, the next vector is formed by applying the first valve, the eleventh valve, the twenty-first valve, and the thirty-first valve to X, Y, Z and W, and the chaos attractors of the pulse wave data are formed in the four-dimensional numerical space by vectors formed similarly.

Next, in order for the unit vector n1=(n1, n2, n3, n4) of the eye direction of the four-dimensional numerical space to be consistent with the fourth axis, each vector (X, Y, Z, W), (n1, n2, n3, n4) is transformed into (X', Y', Z', W'), (n1', n2', n3', n4') by performing the following matrix calculations.

$$\begin{pmatrix} X' \\ Y' \\ Z' \\ W' \end{pmatrix} = \begin{pmatrix} \frac{n_2}{A} & -\frac{n_1}{A} & 0 & 0 \\ \frac{n_1 n_3}{AB} & \frac{n_2 n_3}{AB} & -\frac{A}{B} & 0 \\ \frac{n_1 n_4}{B} & \frac{n_2 n_4}{B} & \frac{n_3 n_4}{B} & -B \\ n_1 & n_2 & n_3 & n_4 \end{pmatrix} \begin{pmatrix} X \\ Y \\ Z \\ W \end{pmatrix}$$

It is important to note that the attractors formed in the four-dimensional numerical space cannot be immediately displayed as figures on a CRT display. First, the coordinates of X", Y" and Z" of the projective point to the three-dimensional numerical space are computed by performing the following matrix calculations.

$$\begin{pmatrix} X'' \\ Y'' \\ Z'' \end{pmatrix} = \begin{pmatrix} 1 & 0 & 0 & -n_1'/n_4' \\ 0 & 1 & 0 & -n_2'/n_4' \\ 0 & 0 & 1 & -n_3'/n_4' \end{pmatrix} \begin{pmatrix} X' \\ Y' \\ Z' \\ W' \end{pmatrix}$$

After that, the coordinates of X'" and Y'" of the above three-dimensional coordinates are projected to the two dimensional numerical space as computed by the following formula.

$$X'''=Y'' \cos\beta \; X'' \cos\alpha$$

$$Y'''=Z''-X''' \tan\beta$$

Where, α and β are the angles between the x and y axes of the three-dimensional space and the x and y axes of the two-dimensional space.

The two-dimensional coordinates of X'" and Y'" obtained in this way are then capable of being output to a CRT display or printer and used as data for subsequent examination.

Next, a method for computing the Lyapunov number will be explained.

Unfortunately, the calculating method a mentioned above cannot be immediately executed because the data obtained from a body surface of the subject actually differs from the data used as the model for the Lyapunov number.

In other words, the data used as the model for the Lyapunov number is obtained by calculating the chaos data by formula (mathematical model) and can be an unlimited series of data. Consequently, data actually obtained from a body surface of the subject does not necessarily correspond to a particular position on the four dimensional vector.

1) In the data obtained from a body surface of the subject, the vector A' (a unit vector) at a certain point A on the four dimensional vector orbit produced from the said pulse wave is not necessarily on the orthogonal position of the orbit.

And, the next vector B" (a unit vector) at the point B is not necessarily on the orthogonal position of the orbit at the point B.

Also, the angle between the vector B' and the vector B" is not necessarily small.

2) As a result, the vector near every point should be examined. For example, when the said vector B" is described only by the condition of merely being near point B', it is advisable to also examine the vector next to point B.

3) Because the number of the data is limited and if the point A is near the end of data, the data of the next point (the position located at point A plus τ) cannot be taken.

4) Because the data is converted into a 12 bit number by A/D conversion and precision is limited, it is possible that conversion of comparable data may incorrectly reflect the exact same value.

Therefore, in the present invention, the following procedures for calculating the Lyapunov number λ1 must be used.

That is to say, a cone is set, of which peak is on the said orbit in the four-dimension space, central line is the vector B', and vertical angle is small. The vector is adopted in this cone.

Even though the said vector B" is very small and has the almost same direction as the orbit, by utilizing the following calculation the possibility of taking the vector of the next point is avoided.

The angle θ between the every vector and the orbit can be calculated by $$\cos\theta = \frac{XX' + YY' + ZZ' + WW'}{\sqrt{X^2+Y^2+Z^2+W^2} \; \sqrt{X'^2+Y'^2+Z'^2+W'^2}}$$

where the vector for each data value is (X, Y, Z, W), the vector for the orbit direction is (X', Y', Z', W').

And, the possibility of mistakenly taking the vector of the next point is avoided by adopting the vector within the range of the upper and the lower limits of the absolute value if every vector of the said vector B" is very small and has almost same direction as the orbit.

The above range which has the most convergent character can be set by observing the said chaos attractor.

Extensible rate of every vector taken in this way is transformed into the logarithm of which has a lower limit of and its arithmetical average value is the first order Lyapunov number λ1.

Figure 5A:
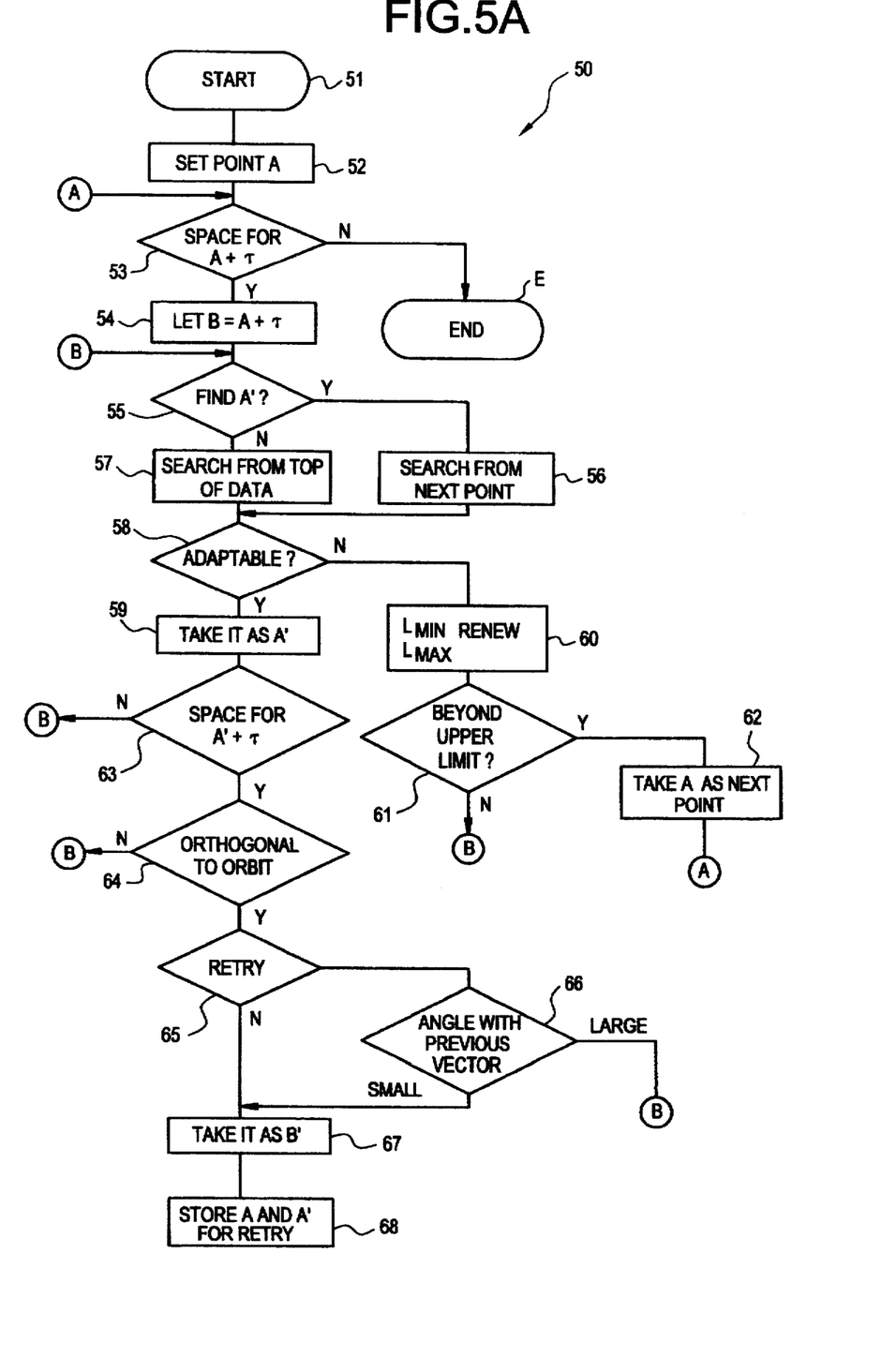
FIGS. 5(A) and 5(B) show a flowchart of computation processing for determining Lyapunov numbers.
Figure 5B:
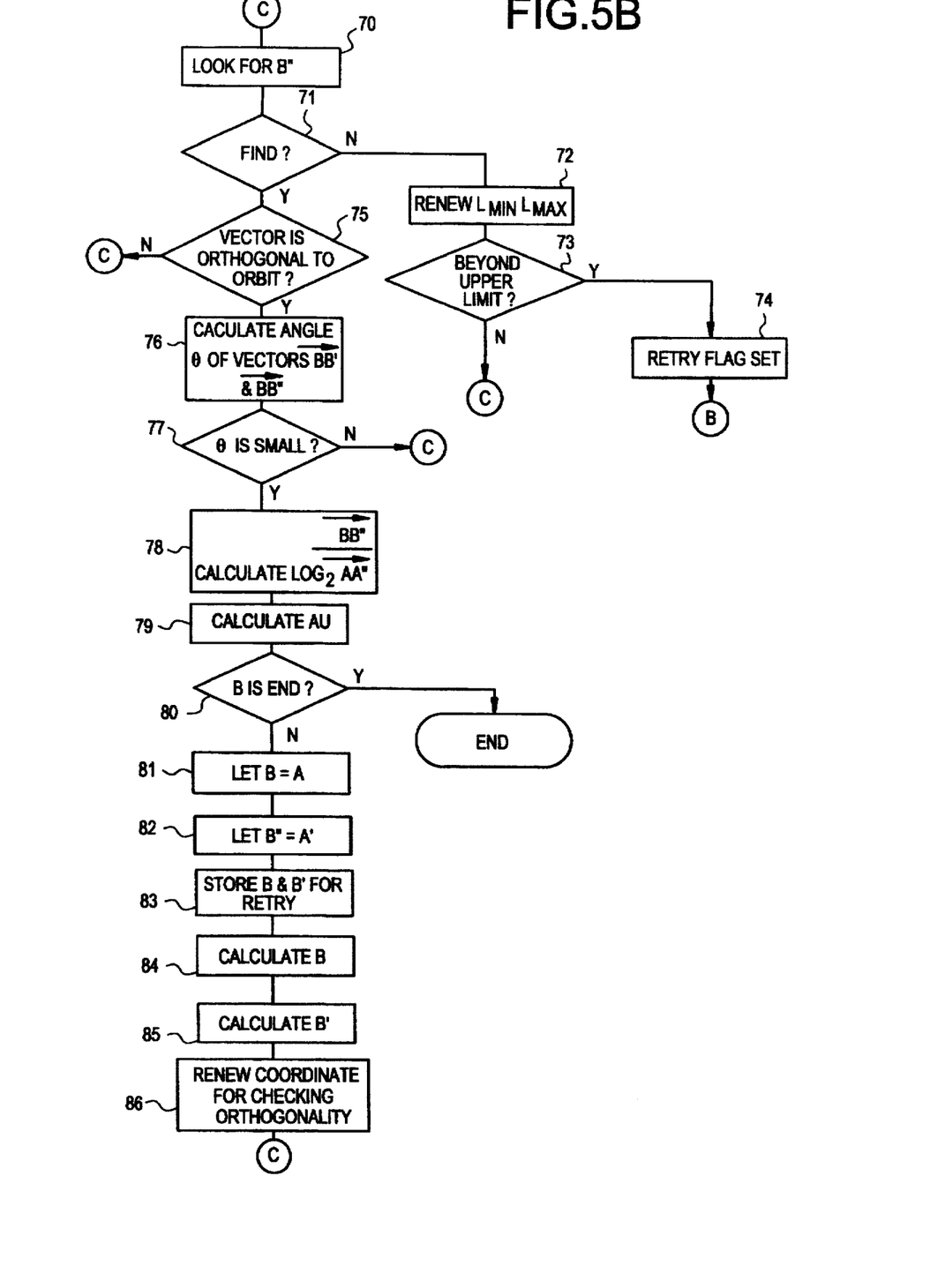

To execute the above calculation, the program (50) shown in FIG. 5a and FIG. 5b is in a micro-computer.

That is to say, to compute the Lyapunov number λ1 (51), first, the point A is set (52) near the starting edge of the orbit of the said vector.

Next, it is evaluated as to whether there is leeway for taking the next point B (the point of τ behind the point A) or not (53), if there is (53), this point B is adopted as the next point (54), a temporary data set is searched for this point B (55), to see if it can be found (55), a temporary data is searched by the next point (56), if it cannot be found the data set is searched from the top (57).

Next, if the searched data adapts to the said adoptive conditions of the data (58)Y, this data is adopted (59), if not (58)N, the range of the size of the vector in the adoptive conditions of the data is changed (60), if the new ranges exceed the upper limit (61)N, the computing returns to Point B (55), otherwise (61)Y, the standard point A is shifted to the point B (62), and the computing returns to the step (53).

The data adopted in this way is evaluated as to whether leeway such that said vector A' develops into the vector B' or not (63). If so (63)Y, it is then evaluated to determine whether vector B' is orthogonal to the orbit (64).

If not (63)N, the computing returns to the step (55).

Next, it is evaluated whether the computing is in retrying will be mentioned later, or not (65). If it is retrying (65)Y, the angle with the last vector is calculated (66). If this angle is large (68)L, the computing returns to the step (55). If it is small (66)S, and in case that it is not in retrying (65)N in the said step (65), it is decided that the vector B' is the vector developed from the vector A'.

Next, the point A and the vector A' are stored (68) for retrying.

When there is no leeway with the next point taken (53)N, the computing is ended (E).

Next, the temporary vector B" at the point B is searched (70), if this vector B" is not fitted for the adoptive conditions of the data (71)N, the range of the size of the vector under the above conditions is updated (72), if the vector still exceeds this upper limit (74)Y, a retry flag is set (74) and the computing returns to step (55).

When the vector does not exceed the upper limit (74)N in step (73), the computing returns to the step (70).

When there is the vector B" fitted for the adoptive conditions of the data (71)Y in the step (71), it is evaluated to determine whether this vector B" is orthogonal to the orbit or not (75). If not (75)N, the computing returns to the step (70), if yes (75)Y, the angle between each vector B' and the vector B" at the point B is calculated (76). It is then evaluated whether this angle is small enough, that is, whether B" is in the said cone (77). In the event that the angle is not small (77)N, the computing returns to the step (70). In the event that it is small (77)Y, the extensible rate from the vector A" to the vector B" caused by removing from the point A to the point B is transformed into the logarithm with a minimum value of 2 (78), and its arithmetical average value is the first order Lyapunov number λ1 (79).

Next, it is evaluated whether point B is at the end of the data (80), if it is not (80)N, the above point B is substituted for the standard point of the next calculation (it corresponds with the above point A) (81), the vector B" is transformed into the unit vector and is substituted for the standard vector of the next calculation (it corresponds with the said vector B') (82), the point B and the vector B' are stored for later comparison with subsequent entries (83), the next value for point B is calculated (84), the vector, which developed from the standard vector is then calculated (85), the coordinate for checking the orthogonalization of the vector used in the next calculation is updated (86), the computing returns to the step (70), and the above calculation is repeated.

When it is determined that point B is the end of the data (80)Y in the step (80), the computing is finished (E).

In short, in steps (52) to (68), the standard point fitted for the adoptive conditions of the data referring the vector B, at the next point is searched. In steps (70) to (77), the developed vector fitted for the same conditions is searched. The previously mentioned process of, setting the adoptive conditions of the data for adoption and searching the data fitted for the adoptive conditions prevents unfitted data from being added in the calculation. Moreover, when the fitted data cannot be found, searching for the data at the point is not abandoned. The first order Lyapunov number λ1 is calculated very precisely by searching and adopting the next fitted data by expanding the setting range of the size of the vector fitted for the adoptive condition.

Next, a description will be made of the computing the second order Lyapunov number λ2.

The computing method of the second order Lyapunov number λ2 is basically same as that of the first order Lyapunov number λ1. The triangle A1–A2–A3 is formed in the four-dimensional numeral space by taking the vector A2 and the vector A3 fitted for the adoptive conditions of the data at the point A1. Next the triangle B1-B-B3 is formed by the vector B2 and the vector B3 which the vector A2 and the vector A3 develop to the next point B1. And the triangle B1-B'-B' is formed by the fitted vector B' and the vector B" taken at the point B1 again. When the angle between the triangle B1–B2–B3 and the triangle B1-B'-B" is small enough, the second order Lyapunov number λ2 is computed by calculating the extensible rate of the area from the triangle A1–A2–A3 to the triangle B1–B2–B3, transforming it into a logarithm greater than or equal to 2 and averaging this value arithmetically.

The angle between each triangle is the angle between the compound vector of the vector B2 and the vector B3, and the compound vector of the vector B' and the vector B".

Based on the above, the chaos attractor obtained by numerically processing information collected from a player is created. Thus, information about the player is first obtained. It is possible to detect the mental and physical state of the player from the data described above and from a Lyapunov number that is a numerical value indicating the degree to which the data matches chaos definition conditions. The game operation and content are controlled according to the mental and physical state of the player. There exists correspondence between the states of a subject and a chaos attractor and/or Lyapunov numbers thus displayed. Therefore, it is possible to correctly recognize the states of mind and body of a subject including his psychological state.

An example of the information regarding the player is measurement of the line of sight of the player, making use of a sensor consisting of a combination of an infrared light-emitting diode and a photosensor.

The relation of mental and physical state to a chaos attractor of finger-like pulse waves can be shown as follows:

(1) The chaos attractor of finger-like pulse waves sensitively reflects the mental and psychological state and indicates an intrinsic topology.

(2) The chaos attractor obtained from pulse waves has a structure common to every person. In addition, it has a structure intrinsic to each individual person. Furthermore, the attractor is affected by mental and psychological states and also by disease.

(3) If the mental and psychological state or physiological state becomes unstable, or if the person gets ill, the whole structure of the attractor is generally simplified, i.e. the structure breaks down, or decreases in size. With respect to rhythm, a mechanical and monotonous periodic structure appears. That is, it becomes less chaotic.

(4) In a healthy state, the whole structure is complex and dynamic. Also, local structures show complex structures such as an entangled structure, a twisted structure, and a screwed structure. The rhythm becomes unperiodic. That is, healthy ecology is chaotic, and is filled with chaos.

(5) If consciousness is concentrated, the chaos attractor becomes complex and local structures such as an entangled structure, a twisted structure, and a screwed structure appear. If stress exceeding a certain threshold value is applied and fatigue results, the structure becomes simpler, and local structures disappear.

The device for obtaining a chaos attractor from information detected from fingers, a palm, or a hand of the player is the simplest and preferable device for obtaining information about a mental and physical state of the player in view of the forms of game machines which are presently put into practical use. Probable reasons for the fact that pulse wave data obtained from a finger tip portion closely relates to cerebral information processing are as follows:

Blood flows and autonomic nerves are concentrated in a finger tip portion of a hand.

The hands are called the second brain. The brain aand the hands closely relate to each other as exemplified by the fact that they develop simultaneously from the viewpoint of embyology.

The hands (finger tip portions) occupy a very large part of the somatesthetic area and the motor area of the brain.

Further, there are provided the cover portion having a shape of a cylinder with a bottom face into which a finger tip portion of a subject can be inserted, and a photosensor in which the infrared light-emitting diode and the phototransistor are provided on an inner surface of the cover portion so that they can respectively be brought into abutment with a ventral portion of the finger tip portion, and that optical axes of the infrared light-emitting diode and the phototransistor intersect in the inside of the finger tip portion at an angle of 20° to 30°. Thus, the sensor is allowed to output a voltage whose waveform precisely corresponds to pulse waves of the finger tip portion by causing infrared light emitted from the infrared light-emitting diode to be reflected in the inside of the finger tip portion and then enter the phototransistor while ambient light is shielded by the cover portion. Any body part such as the head, hips, skin surface, and any other parts may be exploited. Similarly, the sensor installed on the game machine can be placed in various positions.

Another useful example of information obtained from the player is information obtained from the line of sight of the player. A known method of detecting the player's line of sight consists of directing given rays of light to the player's retina, detecting the motion of the retina from reflection of the light rays, and determining the line of sight from the result.

The motion of the line of sight is detected by the above-described well-known method. A chaos attractor is obtained from the information. The game contents are varied according to the chaos attractor. In a TV game, the human player watches contents displayed on the viewing screen to thereby recognize the contents. The player makes the game proceed according to the recognition. That is, the next action of the player is determined by where the line of sight of the player is located. Accordingly, if a chaos attractor is obtained, based on the line of sight of each individual player, and if the game contents are varied according to the chaos attractor, then it follows that each player can vary the game contents independently.

Information on the player obtained in this way is subjected to computation and numerical processing. A decision is made as to whether the obtained level matches any of preset levels. A Lyapunov index is calculated according to the degree. Computer processing is needed for the computations and numerical processing, and for the calculation of the Lyapunov index. This processing method and expression of chaos attractor obtained after the processing are not limited to given calculational formulas and processing sequence. Rather, they can be expressed and processed at will.

Levels which have been previously set to calculate the Lyapunov index can assume various values according to the manner in which chaos attractors are classified and put in order.

DETAILED DESCRIPTION OF THE PREFERRED EMBODIMENTS

A specific example of a response of a game machine according to information detected from a human player will first be described. This example is a TV game in which an airplane attacks a gun battery operated by a human player. The battery tries to shoot down the airplane.

Where the game contents are as described above, the technique for shooting down the airplane which attacks the gun battery is important. When the player tries to shoot down the airplane, the player normally watches the airplane to recognize it. That is, just when or immediately before a cannonball is shot from the battery operated by the player, the line of sight of the player is directed to the airplane to be shot down. Accordingly, the machine can know what airplane is the target of the player, by detecting the line of sight of the player.

The correlation between the action for aiming the gun and the action for firing the gun differs from person to person. This can be obtained as a chaos attractor. Accordingly, the airplane is moved across the viewing screen according to the chaos attractor so that the target airplane cannot be readily shot down. The game contents can be designed so that the player does not get tired without increasing the number of airplanes or without increasing the speed of the airplane exorbitantly. That is, the game contents are such that the target airplane cannot be easily shot down although the airplane is not moving very quickly nor is the number of airplanes exorbitantly large.

It is assumed in this example that the concept of chaos can be applied to information detected from the player. Even if the concept of chaos is not applied to the information which can be collected from the player, the player who is now playing a game is assigned to one of multiple preset levels. The response of the game machine is varied according to the assigned level. In this way, the game can be made more complex, thus attracting the curiosity of the player.

Information from the player can assume various forms such as pulsations, the respiration, the temperature at the face, and weight, as well as the above-described line of sight.

Embodiment 1

Figure 1:
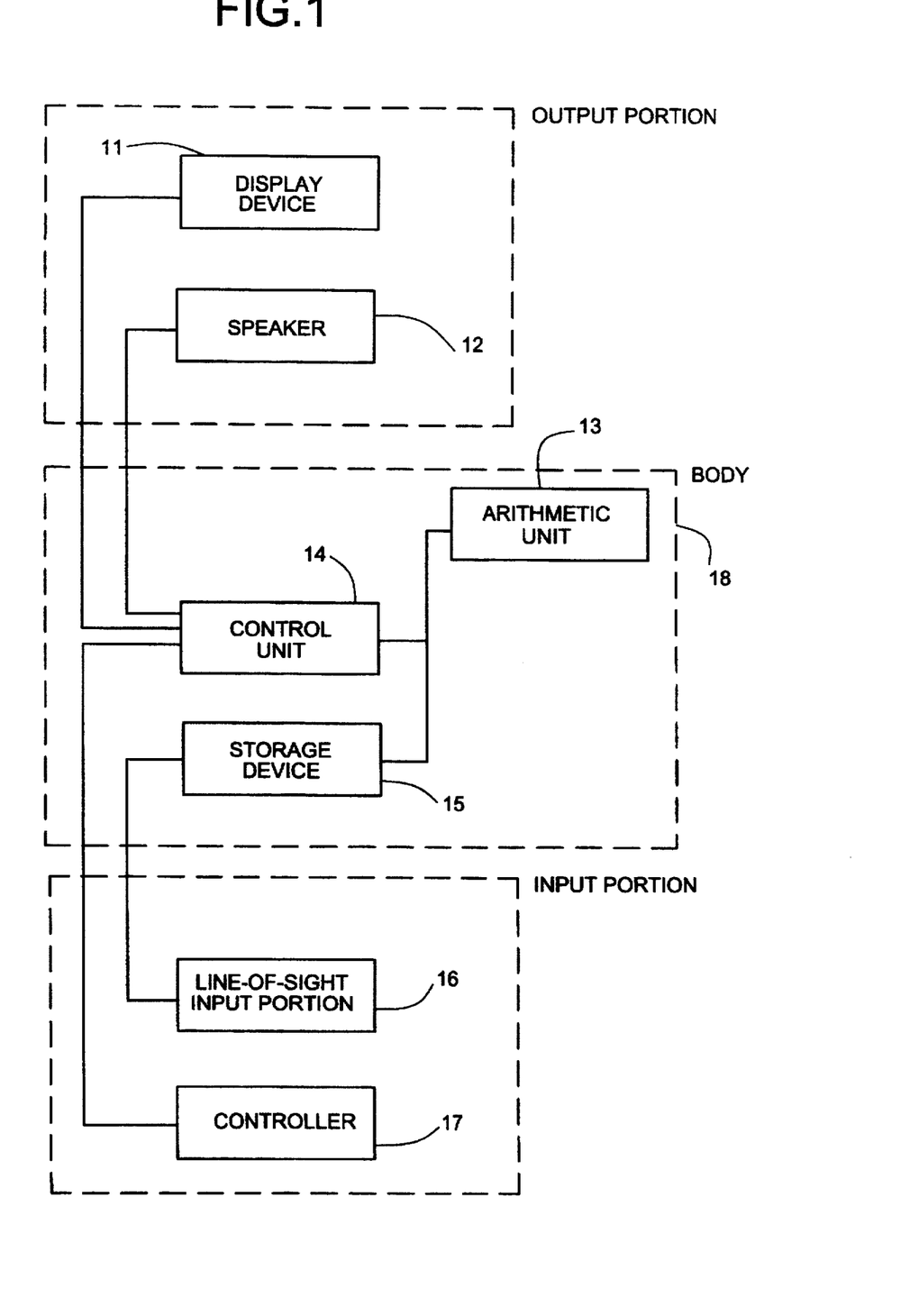
FIG. 1 is a diagram schematically showing the configuration of a game machine in accordance with the present invention.
Figure 2:
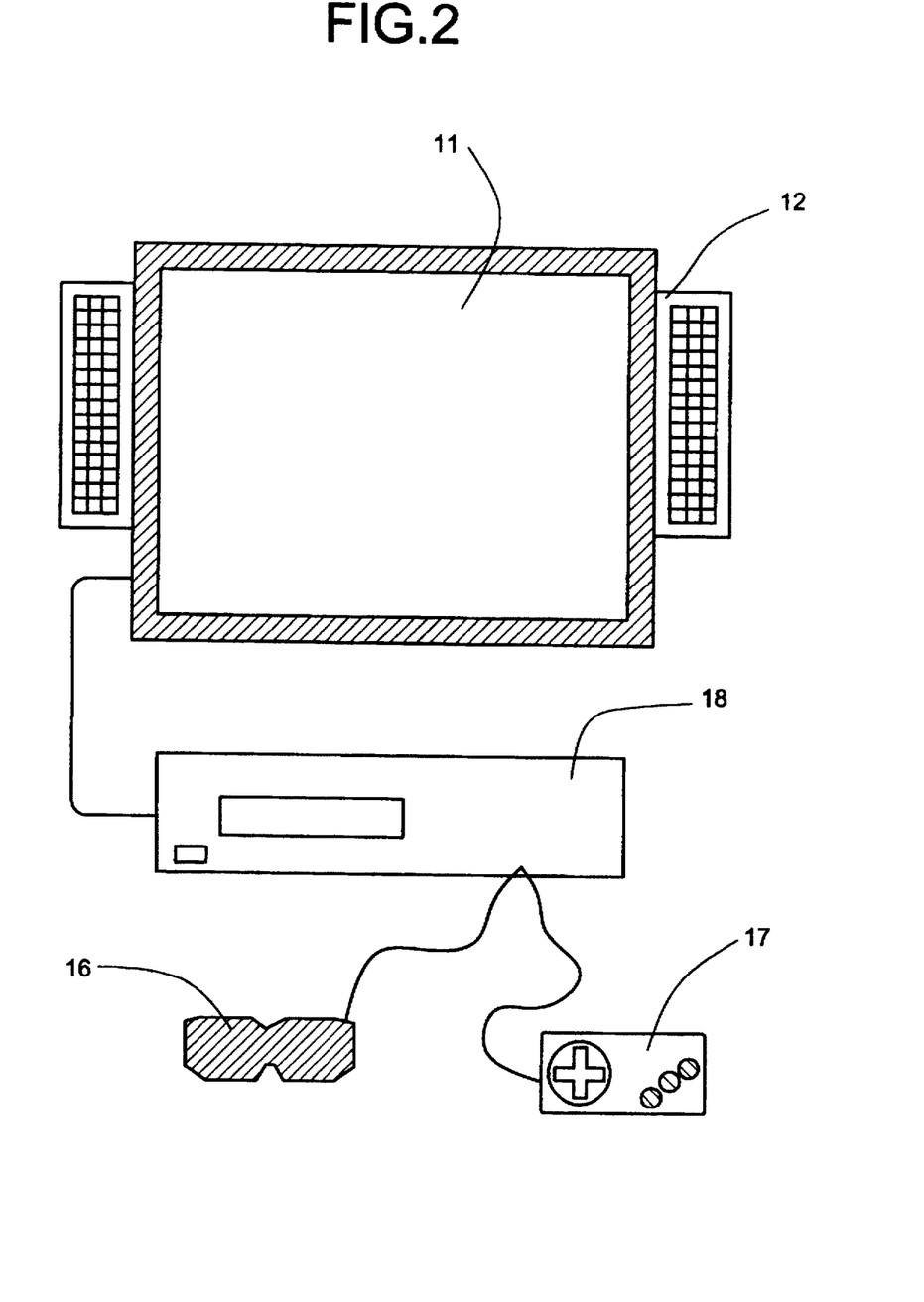
FIG. 2 is a view schematically showing the configuration of a game machine in accordance with the present invention.

In the present example, the invention disclosed herein is applied to a shooting game. FIG. 1 schematically shows a system of a game according to the present example. The configuration of an actual machine corresponding to FIG. 1 is shown in FIG. 2. The system shown in FIG. 1 comprises a body 18, a display device 11 for displaying game contents, an output portion having loudspeakers 12 for producing sound effects and music during progress of a game, and an input portion having a line-of-sight input portion 16 and a controller 17. The body 18 has an arithmetic unit 13, a storage device 15 for storing game contents, and a control unit 14 for controlling input and output signals.

In the configuration shown in FIG. 1, indicated by 16 is a sensor for detecting information from a human player. This sensor acts to detect the line of sight of the player as information. The arithmetic unit acts also as a chaos attractor-generating portion for numerically processing data detected by the sensor 16 and calculating a chaos attractor. The arithmetic unit 13 acts also as a Lyapunov index-creating portion for calculating an index indicative of the degree to which the obtained chaos attractor matches chaos definition conditions. Furthermore, the arithmetic unit 13 serves also as a mental-and-physical state-detecting system portion for detecting the mental and physical state of the player from the Lyapunov index. The arithmetic unit 13 consists of semiconductor integrated circuitry.

What is shown in FIG. 1 is the minimum requisite configuration. Other necessary structures are also provided. Necessary information is stored in the storage circuit. The storage circuit and the control circuit are made of various integrated circuits.

The body and the output portion are interconnected by a cable. Also, the body and the input portion are interconnected by another cable. A large-sized CRT or a large-sized liquid crystal display is used as the display device 11. A conventional TV receiver, a projection type large-area screen, or the like can be employed as the display device 11.

The line-of-sight input device 16 is shaped like goggles. Infrared light is directed to the eyes. The state of the retinas is detected from the reflected light. Then, the direction of the line of sight of the player is detected. Information about the line of sight of the player is entered to the control unit 14 of the body 18. The arithmetic unit 13 performs given arithmetic processing. As a result, the requisite chaos attractor is created.

The controller 17 is held by one hand of the player. The player can manipulate the controller by his or her fingers. By controlling this controller, movement of a spaceship 30 shown in FIG. 3 and irradiation of destructive light rays can be controlled. Furthermore, the speed and the direction of the movement of the spaceship 30 can be controlled.

Figure 3:
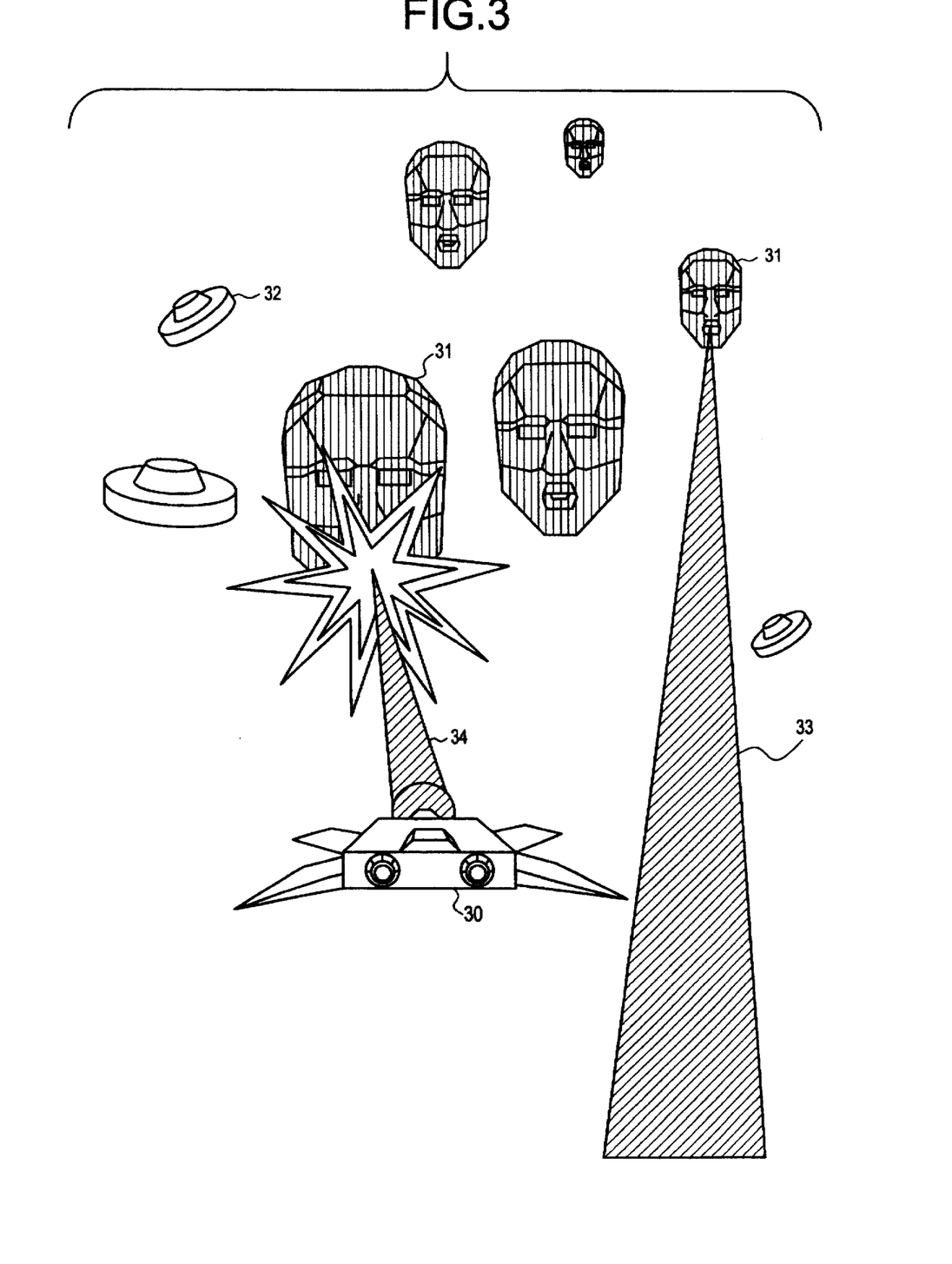
FIG. 3 illustrates an example of a display provided on a display device showing game contents of a game machine in accordance with the present invention.

What is shown in the present example is a one-user game. The user tries to shoot down targets appearing on the viewing screen. FIG. 3 shows an example of a captured image encountered where the game shown in the present example is actually played. In FIG. 3, a spaceship 30 operated by a human player moves on while destroying targets or obstacles 31 by means of destructive light rays 34. The motif of the targets is composed of stone images moving toward the spaceship.

In the captured image shown in FIG. 2, even the targets 31 emit destructive light rays 33 toward the spaceship 30. Therefore, the player must operate the spaceship 30 so as to avoid these rays. Flying saucers 32 are only obstacles. The spaceship 30 should not collide with the saucers.

The configuration shown in the present example is characterized in that the targets 31 and the obstacles 32 are moved across the viewing screen, using a given chaos attractor as a reference. The chaos attractor used here is associated with the line of sight of the player. Specifically, movement of the line of sight detected by the sensor is processed with the given chaos attractor. The targets 31 and the obstacles 32 are moved across the viewing screen, using the given chaos attractor as a reference.

Accordingly, just when or immediately before the player aims at some target and emits destructive light rays, the target moves suddenly in a pattern different from the previous pattern, or the target moves suddenly in a manner not forecasted by the player. Of course, if such a pattern of movement is exhibited in every case, then the pattern will be recognized as a repetitive pattern. Therefore, the timing at which the above-described operation is performed and the amount of movement are required to be established appropriately, for the following reason. If the target automatically moves whenever the light of sight of the player is aligned to the target, then the player will accommodate himself or herself to the situation. The result is that the game becomes uninteresting.

Also, the destructive light rays 33 emitted from the target 31 to the spaceship 30 is preferably controlled together with the movement of the target 31 according to the chaos attractor which is based on the line of sight of the player.

In this configuration, the targets move at times that cannot be forecasted by the player. Moreover, the targets attack the player. It is necessary for the player to play the game while exercising intuition at all times. Hence, the player is under great tension.

For example, where information indicating that the player is interested in one target has arrived at the arithmetic unit from the line-of-sight input device, the arithmetic unit performs given calculations according to the chaos attractor relating to the manner in which the line of sight of the player is moved. The control signal produces a signal such that any target (this portion is calculated by the aforementioned calculations) located off the player's line of sight attack the player.

This configuration makes use of the fact that movement of the player's line of sight can be observed to obey a given chaos attractor or to be close to behaviors indicated by the given chaos attractor.

In this case, the player is attacked in a manner not expected by the player, i.e., the machine is reading the movement of the line of sight of the player. Therefore, even if the movement of the targets is not great, i.e., the game seems not to be very difficult, the player can take great interest in the game. Of course, it is necessary to make such an attack at an appropriate time and even according to the degree of difficulty of the same.

Embodiment 2

In the present example, a chaos attractor is calculated, taking account of the skillfulness of the player. The game contents are varied according to this chaos attractor. In the present example, game contents as illustrated in FIG. 3 are taken as an example.

Where the game contents as illustrated in FIG. 3 result, each individual player exhibits habits and tendencies in controlling the spaceship 30 and destroying the targets 31. In particular, each individual player has an intrinsic pattern of attacks against the targets 31 and an intrinsic pattern of movements for avoiding attacks from the targets 31. According to the findings of the present inventors, such attack patterns and movement patterns intrinsic to the player behave chaotically, which can be expressed in terms of a chaos attractor.

Accordingly, in the game contents as shown in FIG. 3, a chaos attractor is created from the pattern of movements of the spaceship 30 on the display screen. The movement of the targets 31 and the attacks against the spaceship 30 are controlled, using this chaos attractor. In this way, the game contents can be made different among players.

Embodiment 3

In the present example, the equipment of a game arcade equipped with a plurality of game machines to which the concept of chaos is applied is described. A number of game machines are generally arranged in blocks or in rows and columns in a game arcade. All or some of these installed game machines are used as game machines capable of detecting the present mental and physical states of the players. Information from these game machines is processed by a separate computer installed in the arcade. The distribution of players in certain mental and physical states is detected.

For example, the circumstances of the distribution of "unexcited" players are detected. According to the circumstances of the distribution, the kind of music played in a certain region of the arcade is varied. For instance, the environments are varied so that the players may feel "excited" or "get excited." The environments can be matched to the present situations of the players more appropriately by making partial modifications according to the distribution of the players either located in the whole arcade or assuming certain states.

Embodiment 4

In the present example, game contents displayed on one large viewing screen are played by a plurality of players. For example, where the plural players enjoy the game simultaneously while watching the single large screen, the distribution of degrees of skillfulness of the players is analyzed, using a chaos attractor. The game contents can be varied in such a way that even unskilled players can enjoy the game.

If skilled persons and unskilled persons simultaneously play games on the same viewing screen, then players other than the skilled persons are generally uninterested in the game contents.

For example, where the game contents as shown in FIG. 3 are played by plural persons simultaneously, plural spaceships, indicated by 30, are provided. The spaceships are controlled by their respective players. In this case, if the movements of the targets 31 or attacks are matched to the degree of skillfulness of skilled players, then the game contents are too difficult for the other, unskilled players and so the unskilled players are not interested in the game. In other words, the unskilled players cannot keep pace with the progress of the game and take no interest in the game. On the other hand, if movements of the targets 31 and attacks are adjusted to the techniques of poorly skilled players, then the game contents are too simple for the highly skilled players. Again, the skilled players take no interest in the game. For example, the targets 31 can be easily destroyed and thus the game is not interesting to the skilled players.

Accordingly, the line of sight of each player is analyzed with a chaos attractor. The target with which the line of sight is aligned by the player makes a movement or an attack according to the degree of skillfulness of the player. This permits all the players to play the game according to their respective degrees of difficulty. Furthermore, if the game progresses and the degrees of skillfulness of the players vary, the players can be prevented from getting tired by appropriately changing the used chaos attractor.

In all of the examples described thus far, the concept of chaos is applied. It is to be noted that the invention is not limited to this method. For example, a random number generator is used together with a given chaos attractor to impart some degree of uncertainty to the targets 31 shown in FIG. 3.

Moreover, given chaos attractors may be previously stored in the game machine. The chaos attractor which seems to be best suited to the information actually obtained may be used.

Embodiment 5

Figure 4A:
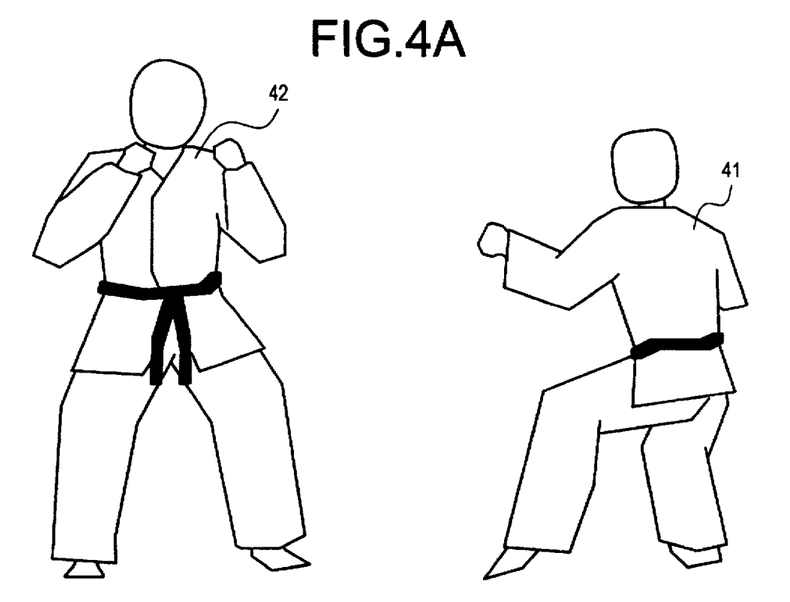
FIGS. 4(A) and 4(B) illustrate examples of displays provided on a display device showing game contents of a game machine in accordance with the present invention.

The present example is a game machine having a viewing screen on which two wresters wrestle with each other. The wresting is controlled by two players. In FIG. 4, a wrestler, indicated by 41, jumps and kicks at another wrestler, indicated by 42. The wrestler 42 is shown to have received the kicking attack.

Figure 4B:
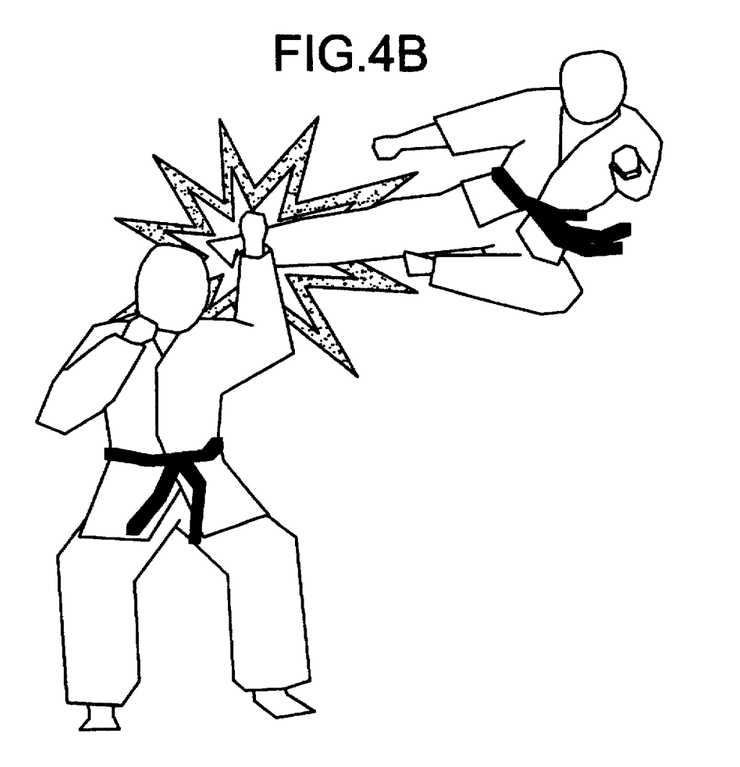

In this game, players can select a desired one of plural techniques and execute it by operation of control levers and buttons. For example, a technique selected from front punch, chopping, jump and kick, turn and kick, and front kick can be executed. When one player is attacked, it can be received as shown in FIG. 4(B) or can be avoided. With respect to the method of avoiding attacks, if one player is attacked by the technique as shown in FIG. 4(B), then an operation can be selected in such a way that a wrestler, indicated by 42, crouches or retreats. In the state shown in FIG. 4(B), after receiving a kick from the wrestler 41, the wrestler 42 can turn to a counterattack by performing front punch. Players judge the combination of these techniques and actions momentarily, creates new combinations successively, and execute them. In this way, the game is made to progress.

Where such games are actually played, the movements of wrestlers on the viewing screen are not smooth in spite of the fact that the players generally violently manipulate the control levers and buttons. As a result, the users feel irritated since techniques are not vividly done. This is caused by the fact that technical actions are not rationally performed.

For example, if jump-and-kick as shown in FIG. 4(B) is repeated continuously, the movement is comical. Also, attacks in the same pattern give the opponent a chance to avoid the attacks. As a result, the game is apparently uninteresting.

In the game contents as illustrated in FIG. 4, the game is very interesting when one complete technique succeeds, taking advantage of an opponent's unguarded moment or when the opponent's posture is disturbed by successive techniques and an additional technique results in a definite success.

In the configuration shown in the present example, the chaos attractor obtained from a player's operation pattern is compared with the chaos attractor (this is required to be examined in advance) occurring when a technique succeeds in practice. The combination of player's techniques and the timing at which techniques are done are corrected so as to approach the chaos attractor occurring when techniques succeed in practice.

Owing to this construction, even a beginner can perform realistically. Also, where a skilled player combats with a beginner, the beginner can compete equally with the skilled player by adopting this mechanism only for the beginner.

Embodiment 6

The present example relates to a game machine used where a single person plays a game with the game machine, unlike the configuration shown in Example 5. In this case, the player combats with a wrestler appearing on the viewing screen controlled by the game machine.

The configuration shown in the present example is characterized in that the opponent wrestler is controlled by making use of one which is similar to the chaos attractor occurring where the player controls the wrestler. In this configuration, the level of the opponent wrestler can be brought close to the level of the player. Consequently, every person at various levels, from beginners to skilled persons, can enjoy the game.

By adopting the inventive configuration disclosed herein as described thus far, game contents or game environments that are matched to either the present mental and physical state of the player or to the response of the player to the game can be offered. Since the game contents, the game response, and game environments can be varied according to the circumstances of the player, the player remains interested in the game for a long time period without getting tired. Especially, the game contents can be accommodated to the degree of skillfulness of the player such that game contents do not occur in one pattern. As a result, novel games can be realized based on players skills.

We claim:

1. A game machine comprising:
    an image display means on which contents of a game are displayed;
    a means for controlling said game contents;
    a means for calculating a chaos attractor obtained by numerically processing information about a human player responding to said game contents; and
    a means for varying the game contents by making use of an index indicating a degree to which said chaos attractor is matched to chaos definition conditions,
    wherein the information about the player includes the line of sight of the player responding to the game contents displayed on the image display means.

2. The game machine of claim 1, wherein the information about the player indicates mental and physical state of the player.

3. The game machine of claim 1, wherein the information about the player includes the playing techniques of the player.

4. A game machine having game contents which are displayed as an image, said game machine comprising:
    a sensor for accepting information from a human player;
    a chaos attractor-generating portion for numerically processing data accepted by said sensor and calculating a chaos attractor;
    a Lyapunov index-generating portion for calculating an index indicating a degree to which said chaos attractor is matched to chaos definition conditions;
    a mental and physical state detecting system portion for detecting mental and physical state of the player from said Lyapunov index; and
    a varying means for varying contents of the image according to information indicating mental and physical state of the player offered from said system portion,
    wherein the information about the player includes the line of sight of the player responding to the game contents displayed on the image display means.

5. The game machine of claim 4, wherein the information from the player indicates mental and physical state of the player.

6. The game machine of claim 4, wherein the information from the player includes the playing techniques of the player.

7. A game machine comprising:
    an image display means on which contents of a game controlled by a plurality of human players are displayed;
    a sensor portion for accepting information from said players;
    a chaos attractor-generating portion for numerically processing data accepted by said sensor and calculating a chaos attractor;
    a Lyapunov index-generating portion for calculating an index indicating a degree to which said chaos attractor is matched to chaos definition conditions;
    a means for calculating information about each individual player from said index; and
    a varying means for varying game contents for each individual player according to information about the individual players,
    wherein the information from the players includes the lines of sight of the players directed to the image display means.

8. The game machine of claim 7, wherein the information from the players indicates mental and physical states of the players.

9. The game machine of claim 7, wherein the information from the players includes the playing techniques of the players.

* * * * *